United States Patent
Blais et al.

(10) Patent No.: US 12,537,739 B2
(45) Date of Patent: Jan. 27, 2026

(54) DYNAMIC INFORMATION PROVISIONING IN COMBAT CLOUD ENVIRONMENTS

(71) Applicant: RTX BBN Technologies, Inc., Cambridge, MA (US)

(72) Inventors: Stephane Yannick Blais, Framingham, MA (US); Michael Hassan Atighetchi, Vero Beach, FL (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 77 days.

(21) Appl. No.: 18/661,132

(22) Filed: May 10, 2024

(65) Prior Publication Data
US 2025/0310190 A1   Oct. 2, 2025

Related U.S. Application Data

(60) Provisional application No. 63/525,838, filed on Jul. 10, 2023.

(51) Int. Cl.
*G06F 15/173*   (2006.01)
*H04L 41/0816*   (2022.01)
*H04L 67/55*   (2022.01)

(52) U.S. Cl.
CPC ......... *H04L 41/0816* (2013.01); *H04L 67/55* (2022.05)

(58) Field of Classification Search
CPC ................ H04L 41/0816; H04L 67/55
See application file for complete search history.

(56) References Cited

U.S. PATENT DOCUMENTS

| | | | |
|---|---|---|---|
| 2008/0034069 A1* | 2/2008 | Schofield | H04W 84/18 709/220 |
| 2015/0127790 A1* | 5/2015 | Smith | H04L 41/0873 709/221 |

* cited by examiner

*Primary Examiner* — Joseph R Maniwang
(74) *Attorney, Agent, or Firm* — CANTOR COLBURN LLP (57) ABSTRACT

A combat cloud environment performs dynamic adaptation of a mission model. The combat cloud environment includes a plurality of nodes and a dynamic information provisioning (DIP) system. The nodes perform a mission in the combat cloud environment, receive first data via a data communication network, and transmit second data via the data communication network. The DIP system transmits the first data via the data communication network and receives the second data via the data communication network. The DIP system dynamically modifies the first data in response to detecting changes in one or a combination of network conditions of the data communications network, requirements of the mission, and a status of the mission, as indicated by the second data. The DIP system automatically disseminates the modified first data indicating the adaptation of the mission model to the plurality of nodes so as to facilitate real-time operational adjustments.

20 Claims, 7 Drawing Sheets

DYNAMIC INFORMATION PROVISIONING IN COMBAT CLOUD ENVIRONMENTS

CROSS-REFERENCE TO RELATED APPLICATIONS

This application claims the benefit of U.S. Provisional Application No. 63/525,838 filed Jul. 10, 2023, the disclosure of which is incorporated herein by reference in its entirety.

GOVERNMENT LICENSE RIGHTS

This application was made with government support under Contract No. FA8750-21-C-0003 awarded by the Air Force Research Laboratory (AFRL). The U.S. Government may have certain rights in this invention.

BACKGROUND

Adapting information exchange in response to changes in mission needs and environmental conditions is a key capability needed to support Command and Control in contested edge environments. Emerging resilient information management systems based on the publish/subscribe paradigm have recently seen adoption for use in combat cloud environments, where information is shared via overlay networks across multiple tactical data links and information is mapped between disparate representation formats. While mission models containing Information Exchange Requirements per mission phase are already supported by these substrates, these conventional mission models lack flexibility in dynamic conditions and are vulnerable to disruptions. Conventional mission models also face difficulties in efficiently managing and sharing information across different platforms and security domains.

SUMMARY

According to a non-limiting embodiment, a method for performing dynamic adaptation of a mission model in a combat cloud environment is provided. The method comprises receiving, via a dynamic information provisioning (DIP) system in communication with a data communication network, data from a plurality of nodes performing a mission according to mission requirements within the combat cloud environment. The method further comprises establishing a publish/subscribe communication system between the DIP system and the plurality of nodes, and utilizing the publish/subscribe system to distribute mission-critical information based on predefined information exchange requirements (IERs). The method further comprises dynamically modifying the IERs in response to detecting changes in one or both of network conditions of the data communications network and the mission requirements to generate the adaptation of the mission model. The method further comprises automatically disseminating the adaptation of the mission model to the plurality of nodes so as to facilitate real-time operational adjustments.

In any one or combination of the embodiments disclosed herein, the detected changes in the network conditions include at least one of a broken communication link, increased latency, reduced throughput, and changes in jitter.

In any one or combination of the embodiments disclosed herein, the method further comprises generating Monitoring Information Objects (MIOs) that report a state of the data communication network to a command center, enabling the dynamic modification of the IERs.

In any one or combination of the embodiments disclosed herein, the MIOs include one or both of data indicating a health status of network paths in the data communication network and data indicating an availability of data routes in the data communication network.

In any one or combination of the embodiments disclosed herein, the mission model is disseminated through an adaptive overlay network that routes information across at least one encrypted tactical data link protocol.

In any one or combination of the embodiments disclosed herein, each of the plurality of nodes are mobile nodes configured to transmit the mission critical information indicating one or both of the requirements of the mission and the status of the mission.

In any one or combination of the embodiments disclosed herein, the method further comprises transforming the data to be sent across the data communication network to different security domains using cross domain solutions (CDS).

In any one or combination of the embodiments disclosed herein, updating the mission model includes prioritizing traffic across the data communication network based on updated mission requirements generated in response to disseminating the adaptation of the mission model.

In any one or combination of the embodiments disclosed herein, the publish/subscribe system caches information throughout the data communication network and shapes a distribution of information using mission-based utility functions that minimize impact on the data communication network.

In any one or combination of the embodiments disclosed herein, the mission-based utility functions adjust a fidelity of information provided to end-users based on a criticality of a mission phase included in the mission and a current capacity of the data communication network.

According to another non-limiting embodiment, a combat cloud environment is configured to perform dynamic adaptation of a mission model. The combat cloud environment comprises a data communication network configured to exchange data, a plurality of nodes in signal communication with the data communication network, and a dynamic information provisioning (DIP). The plurality of nodes are configured to perform a mission in the combat cloud environment and are configured to receive first data via the data communication network and transmit second data via the data communication network. The DIP system is configured to transmit the first data via the data communication network and to receive the second data via the data communication network. The DIP system dynamically modifies the first data in response to detecting changes in one or a combination of network conditions of the data communications network, requirements of the mission, and a status of the mission, as indicated by the second data. The DIP system automatically disseminates the modified first data indicating the adaptation of the mission model to the plurality of nodes so as to facilitate real-time operational adjustments.

In any one or combination of the embodiments disclosed herein, wherein the first data includes predefined information exchange requirements (IERs) contained in the mission model, and the second data includes mission critical information indicating the network conditions of the data communications network, the requirements of the mission, and the status of the mission.

In any one or combination of the embodiments disclosed herein, wherein the detected changes in the network conditions include at least one of a broken communication link, increased latency, reduced throughput, and changes in jitter.

In any one or combination of the embodiments disclosed herein, wherein the second data further includes Monitoring Information Objects (MIOs) that report a state of the data communication network.

In any one or combination of the embodiments disclosed herein, wherein the MIOs include one or both of data indicating a health status of network paths in the data communication network and data indicating an availability of data routes in the data communication network.

In any one or combination of the embodiments disclosed herein, wherein the data network is an adaptive overly network, and wherein the mission model is disseminated through the adaptive overlay network via at least one encrypted tactical data link protocol.

In any one or combination of the embodiments disclosed herein, wherein each of the plurality of nodes are mobile nodes configured to transmit the second data indicating the one or both of the requirements of the mission and the status of the mission.

In any one or combination of the embodiments disclosed herein, wherein the DIP system includes an information gateway configured to map content exchanged between at least two of the nodes or between the DIP and at least one of the nodes, and transforms the data to be sent across security domains included in the data communication network via Cross Domain Solutions (CDSs).

In any one or combination of the embodiments disclosed herein, wherein updating the mission model includes prioritizing traffic across the data communication network to achieve the requirements of the mission corresponding to the adaptation of the mission model.

In any one or combination of the embodiments disclosed herein, wherein the DIS and the plurality of nodes establish a publish/subscribe communication system that caches information throughout the data communication network and shapes a distribution of the data exchanged using mission-based utility functions that minimize impact on the data communication network mission-based utility functions adjust a fidelity of information provided to end-users based on a criticality of a mission phase included in the mission and a current capacity of the data communication network.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

To support resilient sharing of mission critical information at the edge, the United States Air Force (USAF) is implementing the Combat Cloud, a resilient information sharing substrate with self-star properties that provides interoperability across existing and emerging networks (e.g., a "network of networks") and allows real-time information exchange between war fighters and decision makers in order to make decisions faster than the enemy. Multiple recent efforts have demonstrated a resilient information sharing middleware the Robust Information Provisioning Layer (RIPL) that includes an information gateway and network optimizer component in direct support of the Combat Cloud vision. The network optimizer provides adaptive overlay network routing across multiple tactical data links or encrypted tactical data link protocols including, but not limited to, Link16 and Starlink. The optimizer provides not only delivery of information but also visibility into current state of the combat cloud environment, including current choke points with reduced latency/throughput or increased jitter. The information gateway maps content between different representations used by applications and networks, and also transforms information to be sent across security domains via Cross Domain Solutions (CDSs). The information gateway implements publish/subscribe system, caches information throughout the network of networks, and actively shapes information using mission-based utility functions that minimize network impact while providing mission critical information to the right consumers at the right fidelity.

Within the information gateway, Information Exchange Requirements (IERs) represent the data availability and needs of the nodes on the network and as such, express the data needs of the mission. IERs drive the subscriptions that trigger the communication and the content exchange throughout the network of RIPL nodes. This disclosure discusses the design and implementation of dynamic mission models that are needed to support adaptive mission replanning. Monitoring Information Objects (MIOs) communicate the dynamic runtime state of the RIPL network from the content provisioning layer managed by the RIPL, to the mission layer managed by one or more command-and-control (C2) nodes). MIOs are specialized content that gets published by RIPL nodes. Upon detecting a change in the rate of information served via a subscription due to a broken link between two nodes, one of them creates and publishes an MIO about this finding, which gets disseminated via another node to the C2 node. As a result, mission replanning determines that a new asset be dispatched into theater to provide additional networking, leading to yet another node becoming available. In addition, the C2 node publishes updated IERs that affect prioritization of traffic across multiple missions sets.

Unlike a conventional combat cloud environment, a dynamic information provisioning system operates in a combat cloud environment to facilitate the interaction between one or more RIPL nodes, one or more C2 nodes, and one or more MIO devices. The interaction is facilitated through a robust data exchange framework supported by advanced network protocols and security measures. This interaction ensures that: system updates are efficiently propagated throughout the network; adjustments to operational protocols and IERs are implemented swiftly to respond to dynamic mission requirements; and the overall resilience of the combat cloud is maintained, enhancing its capability to operate effectively even in contested or degraded environmental conditions. Accordingly, the dynamic information provisioning system described herein provides a multi-layered, interactive system designed for dynamic information exchange and adaptive command and control in military operations. It integrates advanced data management technologies with strategic control mechanisms to optimize mission effectiveness and resilience in challenging operational scenarios.

Figure 1:
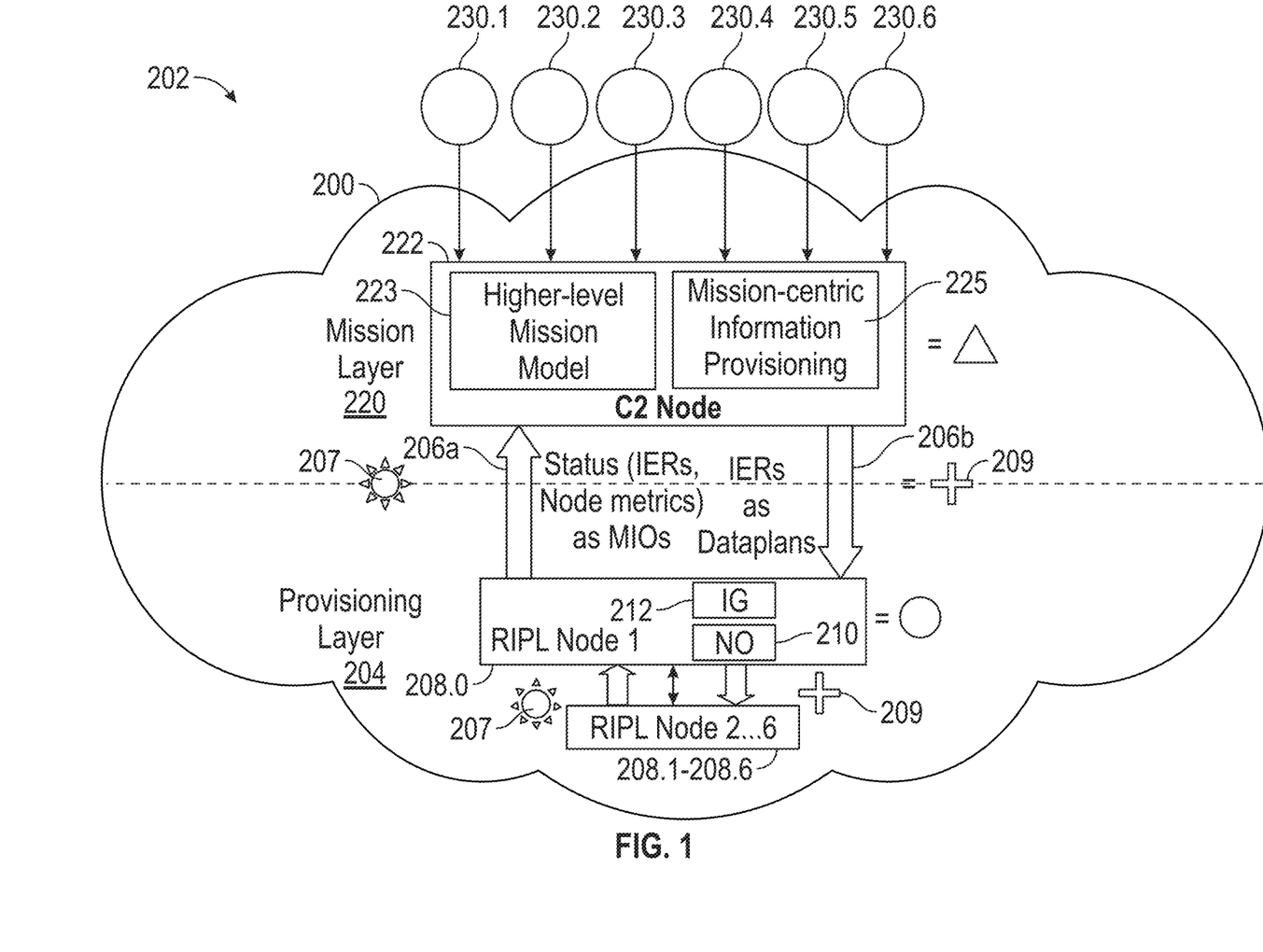
FIG. 1 depicts a dynamic information provisioning (DIP) system operating in combat cloud environment according to a non-limiting embodiment of the present disclosure.

With reference now to FIG. 1, a dynamic information provisioning (DIP) system 200 operating in combat cloud environment 202 is illustrated according to a non-limiting embodiment of the present disclosure. The DIP system 200 is configured to enhance military operations through efficient and resilient information sharing and adaptive information management. The DIP system 200 incorporates multiple layers, components and devices that interact dynamically to establish a DIP data communication network operating in the combat cloud environment 202 to ensure continuous and secure command and control capabilities. In an embodiment, the DIP system 200 includes one or more devices, including one or more hardware processors, which are configured to perform any of the operations described herein and/or recited in any of the claims.

According to a non-limiting embodiment, the DIP system 200 includes a provisioning layer 204, and a mission layer 220 which exchanges data with one or more monitoring information object (MIO) devices 230.1, 230.2, 230.3, 230.4, 230.5 and 230.6 (collectively referred to as MIO devices 230.1-230.6) operating in the combat cloud environment 202. The MIO devices 230.1-230.6 can include, but are not limited to, satellites, drones and unmanned aerial vehicles (UAVs), manually operated vehicles (e.g., ground vehicles, aircraft, seacraft, etc.), and communication devices (e.g., handheld radios, mobile devices, and/or other communication terminals). Although six MIO devices 230.1-230.6 are shown, it should be appreciated that more or less MIO devices can be included in the combat cloud environment 202 without departing from the scope of the present disclosure.

The provisioning layer 204 is in signal communication with the mission layer 220 to dynamically communicate and exchange operational data 206 (206a and 206b) with one another. The exchanged operational data 206 includes status data 206a that is used to facilitate operational efficiency of the combat cloud environment 202 and scenario data 207 that can be used to modify a current mission model. The provisional layer 204 serves as the foundational backbone of the DIP system 200 to ensure the efficient handling and dissemination of critical operational data 206. The provisioning layer 204 includes one or more Robust Information Provisioning Layer (RIPL) nodes 208. According to a non-limiting embodiment, the number of RIPL nodes 208 implemented in the provisional layer 204 has a one-to-one relationship to the number of MIO devices 230.1-230.6.

Each RIPL node 208 is responsible for the collection, processing, and transmission/publication of various types of status data 206a, 206b included in the operational data 206. The status data includes Information Exchange Requirements (IERs) 209 MIO data 207, and node metrics 206a/206b. For example, each RIPL node 208 manages and transmits IERs 209, which define the types and protocols of data exchange needed for each phase of a mission, ensuring that the right information reaches the right components at the right time. The MIO data 207 encapsulate real-time status information about the network's operational state, including alerts on disruptions, resource availability, and security status. The operational data 206 (e.g., the status data) is continuously processed and updated within each RIPL node 208 to adapt to changing operational demands and environmental conditions, maintaining network resilience and data fidelity. The node metrics 206a/206b include performance metrics of the RIPL nodes 208, such as uptime, bandwidth usage, latency, and error rates, which are crucial for monitoring the health and efficiency of the combat cloud.

With continued reference to FIG. 1, each RIPL node 208 includes a network optimizer (NO) 210 and an information gateway (IG) 212, each which directly facilitates decisions performed by the RIPL node 208. The network optimizer 210 provides adaptive overlay network routing across multiple tactical data links such as, for example, Link16 and Starlink. The NO network optimizer provides not only delivery of information but also visibility into current state of the networks operating in the DIP system 200. The visibility includes, for example, current choke points that exist in the DIP system 200, which can cause reduced latency, throughput, and/or increased jitter.

The information gateway 212 facilities a publish/subscribe system that maps content between different representations used by different applications running on different network nodes (e.g., the C2 node 222, the RIPL nodes 208, etc.) and also transforms information to be sent across security domains using, for example, Cross Domain Solutions (CDSs). The information gateway 212 also publishes and subscribes information, caches information throughout the network of RIPL nodes 208, and actively shapes information using mission-based utility functions that minimize network impact such as network congestion, for example, while providing mission critical information to the right consumers at the right fidelity. Within the information gateway 212, the IERs 209 of the operation data 206b represent the data availability and needs of the nodes on the DIP network and as such, express the data needs of the mission. The IERs 209 drive the subscriptions that trigger the communication and the content exchange throughout the network of the RIPL nodes 208.

The MOI object data 207 provided by the MIO devices 230.1-230.6 is specialized content that is published by the RIPL node(s) 208 and that communicates a dynamic runtime state of the DIP network of the content provisioning layer 204 (e.g., managed by the RIPL node(s) 208) to the mission layer 220 (e.g., managed by the C2 node 222).

Figure 2:
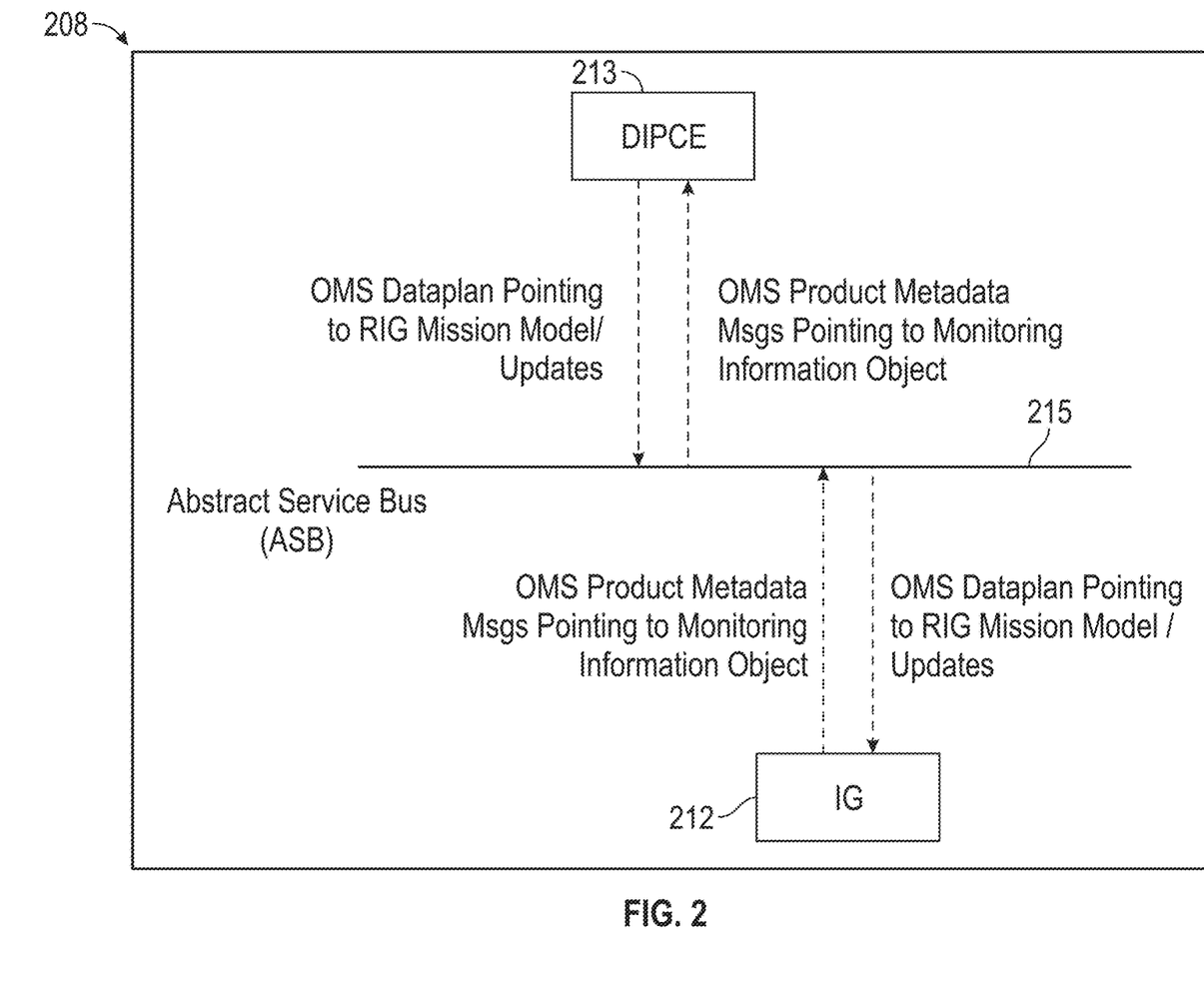
FIG. 2 depicts a RIPL node parsing data to introduce mission model announcement messages that are paired with a mission model according to a non-limiting embodiment of the present disclosure.

According to a non-limiting embodiment, the RIPL node(s) 208 parses universal command and control Interface (UCI) open mission system (OMS) data plan messages to receive Mission Models and produces OMS Product Metadata messages to point to one or more MIO devices 230.1-230.6. FIG. 2, for example, depicts a RIPL node 208 parsing data to introduce mission model announcement messages that are paired with a mission model. The RIPL node 208 is shown exchanging data between the information gateway (IG) 212 and a dynamic information provisioning in combat environments (DIPCE) server 213 via an abstract service bus (ASB) 215. The DIPCE server 213 can run as a backup on a first RIPL node 208 and can become aware of the decisions made and the mission model published by a primary DIPCE server on a second RIPL node (not shown in FIG. 2). Internally in the RIPL software (e.g., applications) executed by the RIPL node 208, the component responsible for mission management is also subscribing to this kind of content. The first and second RIPL nodes 208 exchange their subscriptions. Upon initialization, if a mission model is specified in the configuration, or when a RIPL node 208 is notified of a new mission model, the RIPL software will parse the mission model and become aware of its own subscriptions. A given RIPL 208 can then reliably disseminate them to all RIPL nodes 208. However, the RIPL software executed by a given RIPL node 208 can also be configured to pre-place the subscriptions of other RIPL nodes 208. As it parses the mission model, the RIPL node 208 determines the subscriptions of the other RIPL nodes 208 and preplaces them, meaning it acts as if it received them from the RIPL nodes 208.

In addition to the data parsing function described above, the RIPL nodes 208 can enhance the publish/subscribe logic of the DIP system 200 to allow the publisher of a piece of content to specify known destinations of the content it publishes. In this manner, the RIPL node(s) 208 can immediately send the content to the specified destinations regardless of subscription matches (or lack thereof). Accordingly, the RIPL node(s) 208 can work to eliminate the need to have a base subscription already ingested and break the bootstrapping issue. Thus, regardless of how the RIPL nodes 208 are configured (pre-placed subscriptions or not), a published mission model would be disseminated to all RIPL nodes 208 operating in the DIP network of the combat cloud environment 202.

According to a non-limiting embodiment, the DIP system 200 is configured to communicate knowledge of the state of the network (e.g., the communication status among all RIPL nodes 208) operating in the combat cloud environment 202 to the DIPCE software running on the RIPL nodes 208 so that a given RIPL node 208 can make decisions about the overall mission. In this manner, one or more of the RIPL nodes 208 can publish an updated IERs 209 to change the mission model in response to certain network conditions, triggers, and/or scenario data provided by the MIO devices 230.1-230.6. This knowledge can be provided to an external OMS application listening on the ASB by using OMS Product Metadata (OMSPM) and OMS Product Location (OMSPL) messages that describe the MIO devices 230.1-230.6 and point to a location, e.g., via a Uniform Resource Locator (URL), as shown in FIG. 2.

According to a non-limiting embodiment, the RIPL 208 can be enhanced to provide network knowledge about two main network parameters: (1) attributes of available network paths; and (2) health status of IERs 209. To achieve this enhancement, the underlying networking layer of the RIPL 208 can operate according to the concept of gradient routing to provide efficient multi-QoS routing at the tactical edge, meaning Mobile Ad hoc Networks (MANETs). The network layer informs the content management layer of the reachability status of various nodes in the network as well as path characteristics to these nodes, i.e., the various quality-of-service (QoS) attributes of the paths.

The RIPL nodes 208 can also be enhanced so that subscriptions can be defined to be "local-only", meaning they require to not be disseminated. To achieve this local-only enhancement, an RIPL node 208 expresses mission communication needs via IERs 209 that define the publishing capabilities and the information needs of RIPL nodes 208. According to a non-limiting embodiment, the IERs 209 can be assigned service levels including Minimum, Normal, Maximum, which express how and when a subscribing RIPL node 208 is willing to receive the information. For example, if an RIPL node 208 is publishing a sensor image periodically, the subscriber RIPL node 208 can express how often and at what resolution it is willing to get that image.

The RIPL node 208 can also be enhanced to publish IER 209 health status information objects. According to a non-limiting embodiment, a RIPL node 208 serving as a receiver node knows the associated IER 209 for a subscription of which it receives a piece of content. As mentioned above, IERs 209 can specify different service levels. A publishing RIPL node 208 can shape the information it sends to subscriber RIPL nodes 208 based on the network conditions and/or scenario data provided by the AOI devices 230.1-230.6 at the time of sending. The RIPL node 208 can shape the content in two domains: size and frequency. Accordingly, a health status can be provided to reflect the overall status of the data reception from a given RIPL node 208 as well as the IER service level that the RIPL node 208 shaped and sent that data.

Figure 3:
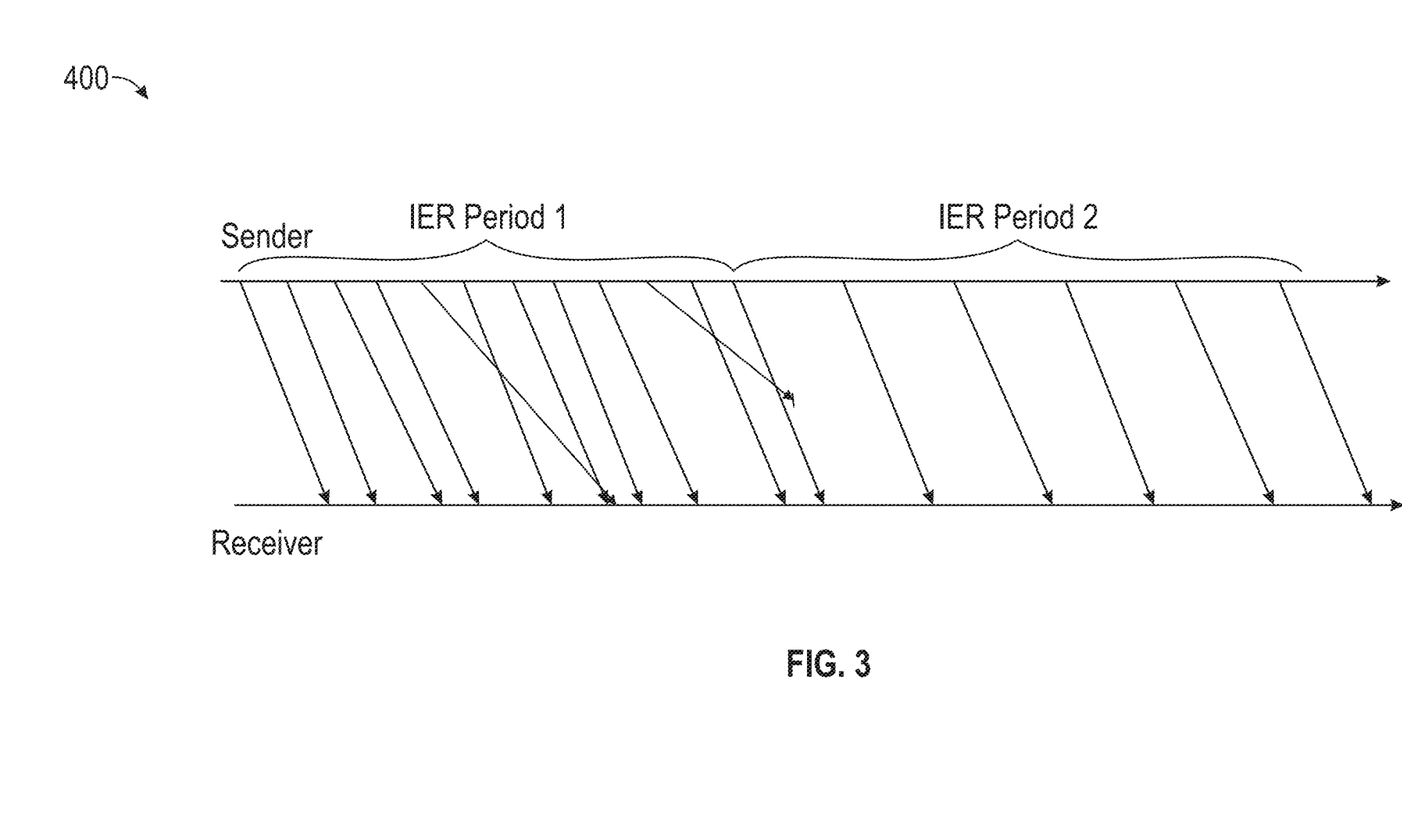
FIG. 3 depicts a timeline of data emitted by a sender RIPL node and received by a subscriber RIPL node 208 operating according to various enhancements.

FIG. 3, is a timing diagram 400 depicting an example of a timeline of data emitted by a sender RIPL node 208 and received by a subscriber RIPL node 208 operating according to the enhancements described above. In a RIPL node 208 described herein, the metadata that accompanies the data specifies the publishing time (at the sender) so that is used to determine the sending period. The relative latency (receive time minus publishing time) gives an indication of how the network is performing over time. Accordingly, the RIPL node 208 publishes an MIO 207 for a publishing RIPL node 208 pair that contains: a timestamp; a IER ID; a publishing node ID; and observed/deduced service point level; a health status: (e.g., normal, degraded, unreachable during which a publisher RIPL node 208 is no longer reachable, silent during which a publisher RIPL node 208 has sent content in the past but no longer sends content.

With continued reference to FIG. 1, the mission layer 220 is in signal communication with the provisional layer 204 to receive the operational data 206. The mission layer 220 is architecturally arranged above the provisioning layer 204 and executes various logic, algorithms, and dynamic mission models to perform decision-making and command execution. The mission layer 220 also exchanges data directly with the MIO devices 230.1-230.6, providing them with timely updates necessary for decision-making. The mission layer 220 provides the MIO devices 230.1-230.6 with directives, which may require system adjustments or the initiation of corrective actions to address emerging issues or optimize network performance of the combat cloud environment 202.

The mission layer 220 includes one or more C2 nodes 222, which serve as a strategic hub within the combat cloud environment 202. The C2 node 222 is configured to receive the operational data 206 (e.g., status data) from one or more of the RIPL nodes 208. The C2 node 222 can execute various mission models 223 and information provisional applications 225, and analyze this data 206 to make informed decisions regarding mission control and operational adjustments. For example, the C2 node 222 processes the incoming published data 206a, (IERs, node metrics, and MIOs) from the provisioning layer 204 and/or the MIO data 207 received from the MIO devices 230.1-230.6 to maintain situational awareness and assess the current mission environment. Based on the analysis of received data 206, the C2 node 222 updates and/or modifies the data 206a, (e.g., the IERs 209) to generate data plans that are returned or published to the provisioning layer 204. These published data plans 206b dictate how operational data should be handled, routed, and prioritized across the combat cloud environment 202 to effectively meet the objectives of one or more mission. Accordingly, the C2 node 222 ensures that the operations of the combat cloud environment 202 align with strategic goals and respond dynamically to evolving scenarios, leveraging real-time data to optimize mission outcomes.

Figure 4:
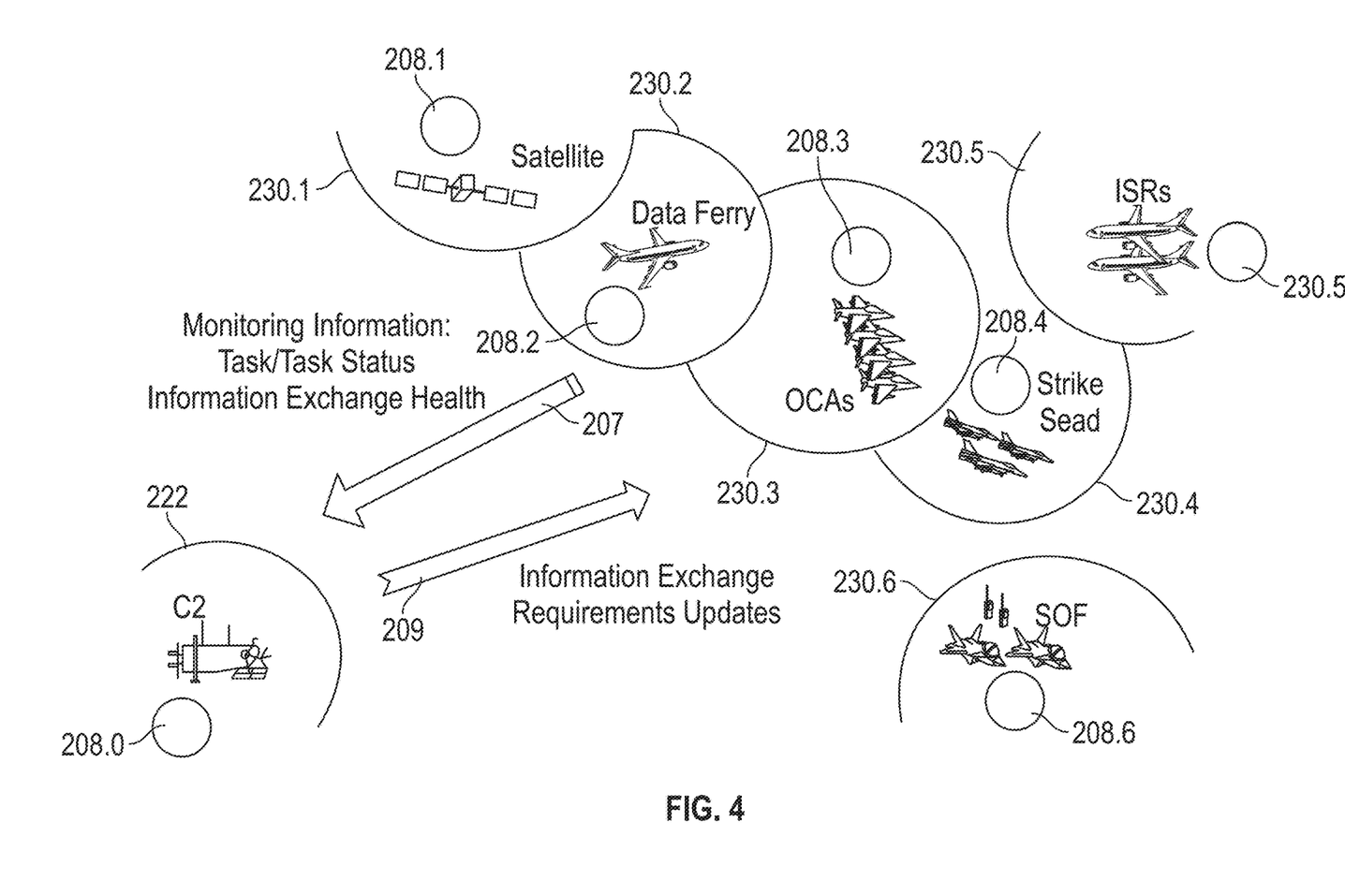
FIG. 4 illustrates the data exchange between MIO devices and a C2 node that is supervising an overall mission according to a non-limiting embodiment of the present disclosure.

Referring now to FIG. 4, the data exchange between MIO devices 230.1-230.6 and a C2 node 222 that is supervising an overall mission according to a non-limiting embodiment. The MIO devices 230.1-230.6 each operate a respective RIPL node 230.1-230.6. The C2 node 222 operates with RIPL node 208.0 to establish the DIP system 200 that serves as a command link, which is in signal communication with each of the MIO devices 230.1-230.6.

In this example the MIO devices 230.1-230.6 can be referred to as "scenario nodes" 230.1-230.6, each which perform respective missions to achieve the overall mission supervised by the C2 node 222. The scenario nodes 230.1-230.6 can include stationary nodes and/or mobile nodes. In this example, the scenario nodes 230.1-230.6 include one or more satellite nodes 230.1, one or more Intelligence, Surveillance and Reconnaissance (ISR) nodes 230.5, one or more Offensive Counterattack (OCA) nodes 230.3, one or more strike node and a Suppression of Enemy Air Defense (SEAD) nodes 230.4, one or more Special Operations Force (SOF) entities 230.6, and one or more Data Ferry nodes 230.2. The satellite node(s) 230.1 are configured to relay data from one or more of the remaining scenario nodes 230.1-230.6 to the C2 node 222, and vice versa. The ISR node(s) 230.5 can provide imagery and tracking data of adversarial air and/or ground forces. The OCA nodes 230.3 can serve to keep some adversarial air forces at bay. The SEAD nodes 230.4 are tasked as a primary strike force with a mission to strike adversarial forces. The SOF entities 230.6 perform various missions on the ground while exchanging data via the satellite node. The Data Ferry node(s) 230.2 showcases the ability for a RIPL node 208 (see FIG. 1) to communicate in a Disadvantaged, Intermittent, high-Latency (DIL) environment.

According to a non-limiting embodiment, RIPL node 208.0 can automatically receive MIOs 207 from the scenario nodes 230.1-230.6 in response to certain types of triggers throughout a mission execution and the C2 node 222 can dynamically modify the IERs 209 based on an MIO 207. The types of triggers include, but are not limited to, tasking or re-tasking of the scenario nodes 230.1-230.6 during the overall mission execution and changes in network conditions affecting the information exchanges. As shown in FIG. 4, the C2 node 222 can react to scenario data 207 received from the 230.1-230.6 to change and disseminate a mission's IERs 209, which are then provided to the scenario nodes 230.1-230.6.

An example scenario will now be described with continued reference to FIG. 4. In this scenario the data-ferry node 230.2 is alternately connected to the C2 node 222 via RIPL node 208, then completely disconnected from any of the remaining scenario nodes, then connected to one of the ISR node 230.5, then completely disconnected again and then connected again to the C2 node 222, and the cycle of disconnection connections repeats. Given the resiliency and robustness of the RIPL data exchange protocols, this allows data to flow to and from the isolated ISR node 230.5 over time from and to the other scenario nodes 230.5 operating in the combat cloud environment 202, with the data-ferry node 230.2 carrying the data back and forth to the scenario nodes 230.1-230.6 it is connected to one at a time.

During the course of the overall mission, for example, communication with the SEAD node 230.4 is lost and as a result the strike mission is assumed to have failed. RIPL node 208.0 receives an MIO 207 indicating loss of communication with the SEAD node 230.4 and the C2 node 222 then modifies the mission model to task a pair of OCA nodes 230.3 to strike the target initially assigned to the SEAD node 230.4. The mission modification requires the IERs 209 of the OCA nodes 230.3 to be modified as they now need to receive adversarial ground tracking information and imagery on top of the adversarial air tracking data they were already receiving. The SOF element 230.6 connects to the rest of the scenario nodes 222 via the satellite node 230.1 and receives adversarial ground tracking information. Using encrypted text-based messages, for example, the SOF entities 230.1 requests Close Air Support (CAS) to strike a secondary ground target as well as additional reconnaissance data. The C2 node 222 can then repurpose the SEAD node 230.4 and task it with the CAS strike. The C2 node 222 is then tasked to manage the isolated ISR node 230.5 with a different reconnaissance task. As a result of these new tasks, the IERs 209 for SEAD 230.4 and for the isolated ISR 230.5 are modified. Throughout the course of the overall mission, the modified mission model is published by the DIPCE server 213 on the C2 node 222. The RIPL software executed by the RIPL node 208.0 then disseminates the modified IERs 209 indicating the modified mission model to all the scenario nodes 230.1-230.6 operating in the combat cloud environment 202. At least one advantage of the DIP system 200 described herein resides in the automation and the speed of deployment of the new IERs rather than requiring human intervention to modify the IERs and manually set up new communication channels. Such human intervention can take a significant amount of time and is susceptible to human error which can be detrimental to the overall mission.

Figure 5:
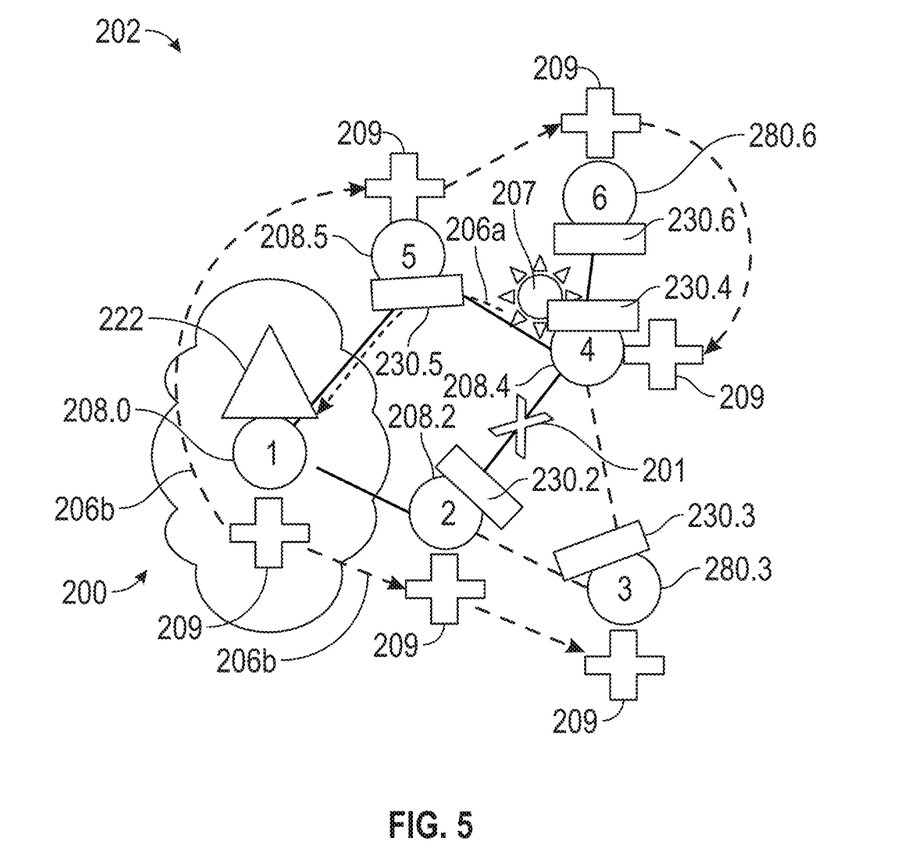
FIG. 5 is a process flow diagram depicting operation of a DIP system according to a non-limiting embodiment of the present disclosure.

Referring now to FIG. 5, an operation flow process of the combat cloud environment 202 is illustrated according to a non-limiting embodiment. In this example, the combat cloud environment 202 includes a DIP system 200 and a plurality of MIO devices 230.2-230.6. The DIP system 200 includes a C2 node 222 operating RIPL node 208.0, while each of the MIO devices 230.2-230.6 operate their respective RIPL node 208.2-208.6. The combination of the C2 node 222 and RIPL node 208.0 is referred to as "node 1", while the combination the MOI devices 230.2-230.6 and respective RIPL node 208.2-208.6 are referred to as "nodes 2 through 6."

Upon detecting a change in the rate of information served via a subscription due to a broken link 201 between nodes 2 and 4, node 4 creates and publishes an MIO 207 about this finding, which gets disseminated from node 5 to the C2 via RIPL 208.0 of node 1. As a result, mission replanning determines that a new asset (e.g., node 3) be dispatched into theater to provide additional networking. Accordingly, the mission replanning leads to node 3 becoming available and able to communicate with nodes 2 and 4 via a new communication path, thereby compensating for the broken link 201. In addition, the C2 node 222 publishes updated IERs 209 that affect prioritization of traffic across multiple missions sets.

Figure 6:
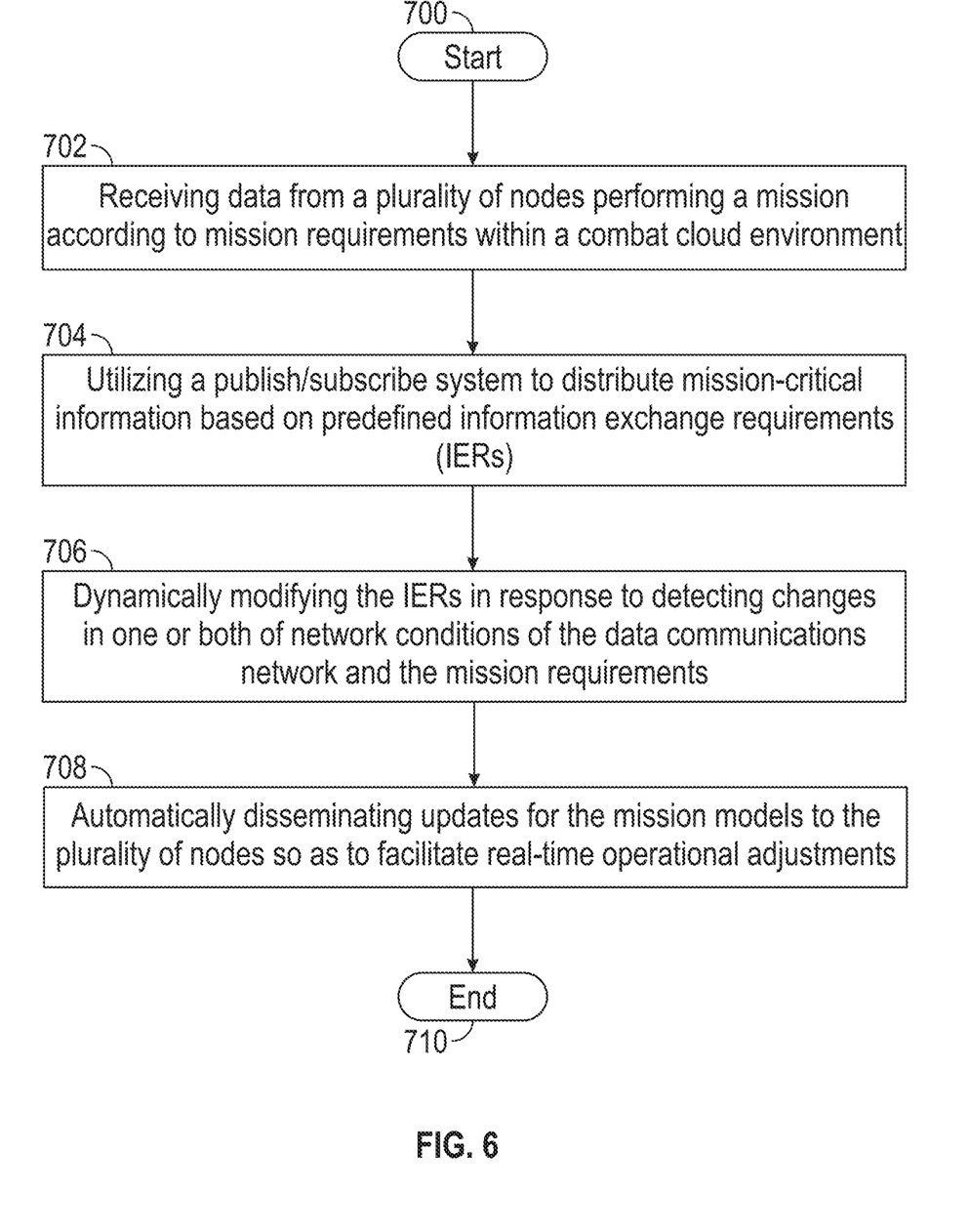
FIG. 6 is a flow diagram illustrating a method for performing dynamic adaptation of mission models in a combat cloud environment according to a non-limiting embodiment of the present disclosure.

Turning to FIG. 6, a method for performing dynamic adaptation of mission models in a combat cloud environment is illustrated according to a non-limiting embodiment of the present disclosure. The method begins at operation 700 and at operation 702 data is received from a plurality of nodes performing a mission according to mission requirements within a combat cloud environment. At operation 704, a publish/subscribe system is utilized to distribute mission-critical information based on predefined information exchange requirements (IERs). At operation 706, the IERs are dynamically modified in response to detecting changes in one or both of network conditions of the data communications network and the mission requirements. At operation 708, updates for the mission models are automatically disseminated to the plurality of nodes to facilitate real-time operational adjustments, and the method ends at operation 710.

Figure 7:
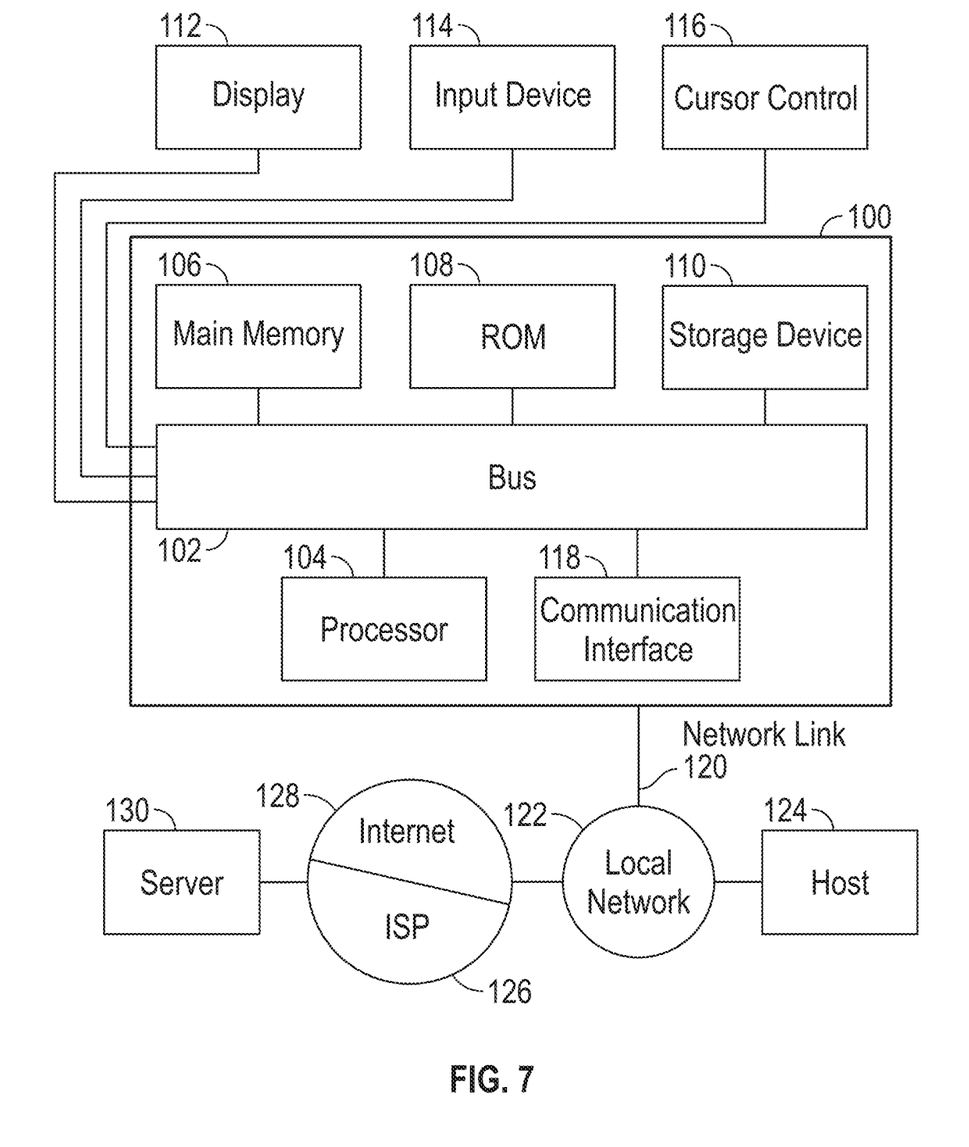
FIG. 7 is a block diagram of an example of a computer system according to a non-limiting embodiment of the present disclosure.

Referring to FIG. 7 a block diagram of an example of a computer system 100 capable of operating the DIP system 200 is illustrated according to a non-limiting embodiment of the present disclosure. Computer system 100 includes a bus 102 or other communication mechanism for communicating information, and a hardware processor 104 coupled with the bus 102 for processing information. Hardware processor 104 may be a general-purpose microprocessor.

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Such instructions, when stored in one or more non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a liquid crystal display (LCD), plasma display, electronic ink display, cathode ray tube (CRT) monitor, or any other kind of device for displaying information to a computer user. An input device 114, including alphanumeric and other keys, may be coupled to bus 102 for communicating information and command selections to processor 104. Alternatively or additionally, computer system 100 may receive user input via a cursor control 116, such as a mouse, a trackball, a trackpad, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. Alternatively or additionally, computer system 100 may include a touchscreen. Display 112 may be configured to receive user input via one or more pressure-sensitive sensors, multi-touch sensors, and/or gesture sensors. Alternatively or additionally, computer system 100 may receive user input via a microphone, video camera, and/or some other kind of user input device (not shown).

Computer system 100 may implement the techniques described herein using customized hard-wired logic, one or more ASICs or FPGAs, firmware, and/or program logic which in combination with other components of computer system 100 causes or programs computer system 100 to be a special-purpose machine. According to one embodiment, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. Alternatively or additionally, hard-wired circuitry may be used in place of or in combination with software instructions.

In an embodiment, one or more non-transitory computer-readable storage media store instructions that, when executed by one or more hardware processors, cause performance of any of the operations and/or methods described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques, methods, and/or operations performed by the DIP system 200 described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 102. Transmission media may also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 100 may receive the data from the network and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122, and communication interface 118.

The received code may be executed by processor 104 as it is received, and/or stored in storage device 110, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In embodiment, a machine learning engine trains a machine learning model to perform one or more operations described herein. Training a machine learning model uses training data to generate a function that, given one or more inputs to the machine learning model, computes a corresponding output. The output may correspond to a prediction based on prior machine learning. In an embodiment, the output includes a label, classification, and/or categorization assigned to the provided input(s). The machine learning model corresponds to a learned model for performing the desired operation(s) (e.g., labeling, classifying, and/or categorizing inputs). A system may use multiple machine learning engines and/or multiple machine learning models for different purposes.

In an embodiment, the machine learning engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine receives positive and/or negative reinforcement in the process of attempting to solve a particular problem (e.g., to optimize performance in a particular scenario, according to one or more predefined performance criteria). In an embodiment, the machine learning engine initially uses supervised learning to train the machine learning model and then uses unsupervised learning to update the machine learning model on an ongoing basis.

In an embodiment, a machine learning engine may use many different techniques to label, classify, and/or categorize inputs. A machine learning engine may transform inputs into feature vectors that describe one or more properties ("features") of the inputs. The machine learning engine may label, classify, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, and/or categorizes inputs based on the vectors. Alternatively or additionally, the machine learning engine may use a naïve Bayes classifier to label, classify, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

It should be understood that all embodiments which have been described may be combined in all possible combinations with each other, except to the extent that such combinations have been explicitly excluded.

Finally, nothing in this Specification or the Appendix shall be construed as an admission of any sort. Even if a technique, method, apparatus, or other concept is specifically labeled as "prior art," "conventional," "background," "existing," etc., Applicant make no admission that such technique, method, apparatus, or other concept is actually prior art under 35 U.S.C. § 102 or 103, such determination being a legal determination that depends upon many factors, not all of which are known to Applicant at this time.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the various embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A method for performing dynamic adaptation of a mission model in a combat cloud environment, comprising:
    receiving, via a dynamic information provisioning (DIP) system in communication with a data communication network, data from a plurality of nodes performing a mission according to mission requirements within the combat cloud environment;
    establishing a publish/subscribe communication system between the DIP system and the plurality of nodes, and utilizing the publish/subscribe system to distribute mission-critical information based on predefined information exchange requirements (IERs);
    dynamically modifying the IERs in response to detecting changes in one or both of network conditions of the data communications network and the mission requirements to generate the adaptation of the mission model; and automatically disseminating the adaptation of the mission model to the plurality of nodes so as to facilitate real-time operational adjustments.

2. The method of claim 1, wherein the detected changes in the network conditions include at least one of a broken communication link, increased latency, reduced throughput, and changes in jitter.

3. The method of claim 1, further comprising generating Monitoring Information Objects (MIOs) that report a state of the data communication network to a command center, enabling the dynamic modification of the IERs.

4. The method of claim 3, wherein the MIOs include one or both of data indicating a health status of network paths in the data communication network and data indicating an availability of data routes in the data communication network.

5. The method of claim 1, wherein the mission model is disseminated through an adaptive overlay network that routes information across at least one encrypted tactical data link protocol.

6. The method of claim 1, wherein each of the plurality of nodes are mobile nodes configured to transmit the mission critical information indicating one or both of the requirements of the mission and the status of the mission.

7. The method of claim 1, further comprising transforming the data to be sent across the data communication network to different security domains using cross domain solutions (CDS).

8. The method of claim 1, wherein updating the mission model includes prioritizing traffic across the data communication network based on updated mission requirements generated in response to disseminating the adaptation of the mission model.

9. The method of claim 1, wherein the publish/subscribe system caches information throughout the data communication network and shapes a distribution of information using mission-based utility functions that minimize impact on the data communication network.

10. The method of claim 9, wherein the mission-based utility functions adjust a fidelity of information provided to end-users based on a criticality of a mission phase included in the mission and a current capacity of the data communication network.

11. A combat cloud environment configured to perform dynamic adaptation of a mission model, the combat cloud environment comprising:
a data communication network configured to exchange data;
a plurality of nodes performing a mission in the combat cloud environment and configured to receive first data via the data communication network and transmit second data via the data communication network; and
a dynamic information provisioning (DIP) system configured to transmit the first data via the data communication network and receive the second data via the data communication network,
wherein the DIP system dynamically modifies the first data in response to detecting changes in one or a combination of network conditions of the data communications network, requirements of the mission, and a status of the mission, as indicated by the second data, and
wherein the DIP system automatically disseminates the modified first data indicating the adaptation of the mission model to the plurality of nodes so as to facilitate real-time operational adjustments.

12. The combat cloud environment of claim 11, wherein the first data includes predefined information exchange requirements (IERs) contained in the mission model, and the second data includes mission critical information indicating the network conditions of the data communications network, the requirements of the mission, and the status of the mission.

13. The combat cloud environment of claim 11, wherein the detected changes in the network conditions include at least one of a broken communication link, increased latency, reduced throughput, and changes in jitter.

14. The combat cloud environment of claim 11, wherein the second data further includes Monitoring Information Objects (MIOs) that report a state of the data communication network.

15. The combat cloud environment of claim 14, wherein the MIOs include one or both of data indicating a health status of network paths in the data communication network and data indicating an availability of data routes in the data communication network.

16. The combat cloud environment of claim 11, wherein the data network is an adaptive overly network, and wherein the mission model is disseminated through the adaptive overlay network via at least one encrypted tactical data link protocol.

17. The combat cloud environment of claim 11, wherein each of the plurality of nodes are mobile nodes configured to transmit the second data indicating the one or both of the requirements of the mission and the status of the mission.

18. The combat cloud environment of claim 11, wherein the DIP system includes an information gateway configured to map content exchanged between at least two of the nodes or between the DIP and at least one of the nodes, and transforms the data to be sent across security domains included in the data communication network via Cross Domain Solutions (CDSs).

19. The combat cloud environment of claim 12, wherein updating the mission model includes prioritizing traffic across the data communication network to achieve the requirements of the mission corresponding to the adaptation of the mission model.

20. The combat cloud environment of claim 19, wherein the DIS and the plurality of nodes establish a publish/subscribe communication system that caches information throughout the data communication network and shapes a distribution of the data exchanged using mission-based utility functions that minimize impact on the data communication network mission-based utility functions adjust a fidelity of information provided to end-users based on a criticality of a mission phase included in the mission and a current capacity of the data communication network.

* * * * *